UNITED STATES PATENT OFFICE.

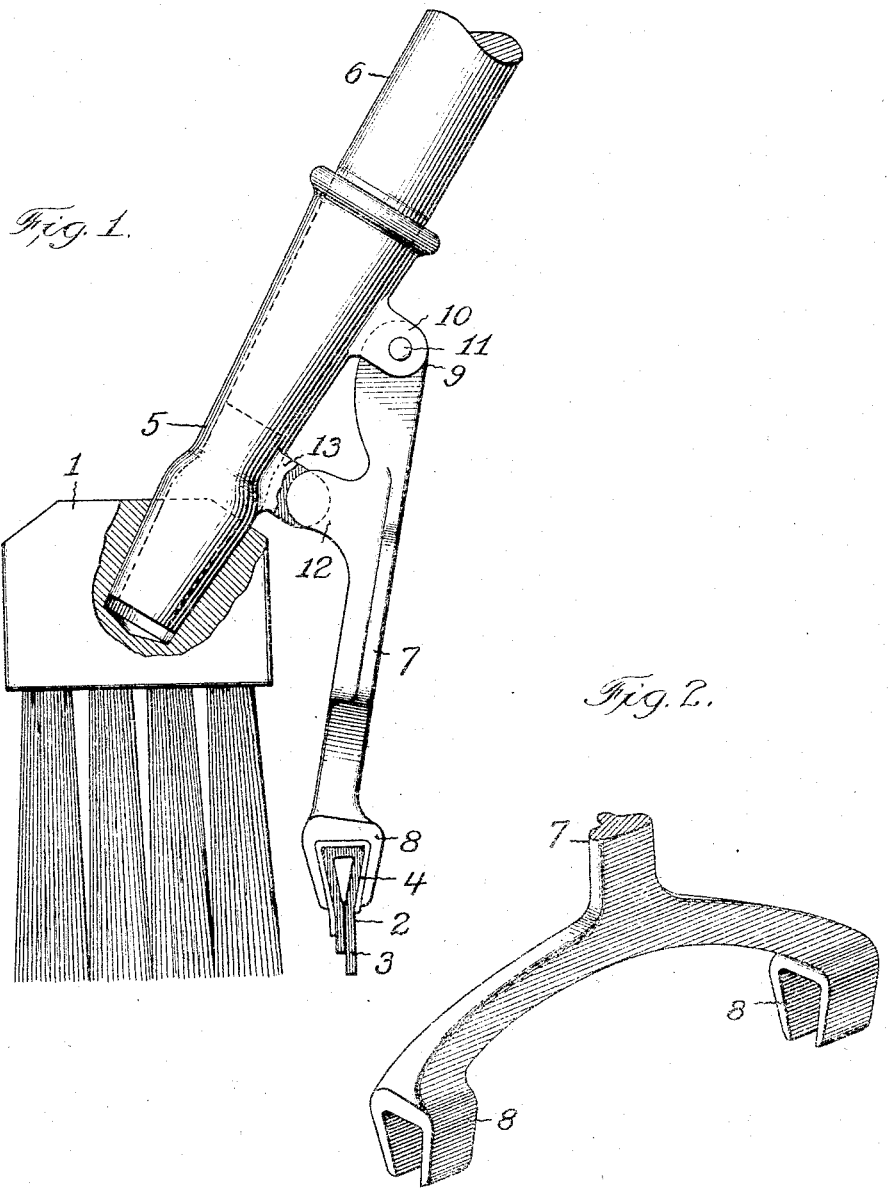

PETER SHANNON, OF CHICAGO, ILLINOIS.

BRUSH AND WIPER FIXTURE.

1,035,250.

Specification of Letters Patent. Patented Aug. 13, 1912.

Application filed September 18, 1911. Serial No. 649,966.

*To all whom it may concern:*

Be it known that I, PETER SHANNON, a citizen of the United States of America, and a resident of Chicago, in the county of Cook, State of Illinois, have invented certain new and useful Improvements in Brush and Wiper Fixtures, of which the following is a specification.

This invention relates to combined window washing brushes and wipers, and has for its object to provide a simple and efficient construction and combination of parts adapted to afford a connected brush and wiper adapted for ready alternate use as required in cleaning store windows and the like, and with which the wiper can be readily swung out of the way when the appliance is used as a brush in the initial window washing operation, all as will hereinafter more fully appear.

In the accompanying drawings: Figure 1, is a side elevation of the present appliance in place in an ordinary window washing brush. Fig. 2, is a detail perspective view of the appliance.

Similar reference numerals indicate like parts in both views.

Referring to the drawings, 1 represents the usual window washing brush, and 2 the wiper of the ordinary form generally known as a "squeegee," and consisting of a strip of rubber fabric 3 secured in a metal back 4, as shown in Fig. 1.

5 is a tapering tubular sleeve, the smaller and lower end of which is adapted to fit a correspondingly tapered orifice in the brush body to attain a rigid and substantial connection of the parts. The upper and larger end of said sleeve is adapted to receive in turn the tapering end of an ordinary pole or handle 6, by which the implement is manipulated in reaching the higher portion of store windows and the like, and said upper portion will have sufficient length so that it can be grasped directly by the hand of the operator in cleaning nearly adjacent show windows and the like.

7 is the middle portion of the connecting member or fixture by which attachment of the wiper 2 is made to the tubular sleeve 5, aforesaid, and for such purpose one end of the fixture is forked and provided with holding jaws 8 adapted to receive and hold the base portion or back of the wiper 2. At its other end said fixture 4, is formed with a pivot eye 9, adapted to fit between a pair of pivot lugs 10, on the sleeve 5, and be pivotally attached by a pivot pin or rivet 11, as shown.

12 is a lateral lug on the middle portion of the connecting member or fixture 7, adapted to frictionally engage between a pair of lugs 13 on the sleeve 5, to hold the said fixture in its active position, against accidental displacement.

When not required for actual use the fixture 7 carrying the wiper 2, can be turned up and out of the way against the pole or handle 6.

Having thus fully described my said invention what I claim as new and desire to secure by Letters Patent, is:—

1. A connecting fixture for window cleaning brushes and wipers, comprising a sleeve adapted to fit an orifice in the brush body, and a connecting member attached to said sleeve in a pivotal manner at one end and provided at its other end with a pair of holding jaws for a wiper, substantially as set forth.

2. A connecting fixture for window cleaning brushes and wipers, comprising a sleeve adapted to fit an orifice in the brush body, and a connecting member attached to said sleeve in a pivotal manner at one end and provided at its other end with a pair of holding jaws for a wiper, a lateral plug on the middle portion of the connecting member, and a pair of lugs on the sleeve for engaging the same, substantially as set forth.

Signed at Chicago, Illinois, this 9th day of September, 1911.

PETER SHANNON.

Witnesses:
ROBERT BURNS,
JOSEPH P. RAFFERTY.